Patented Mar. 3, 1942

2,274,705

UNITED STATES PATENT OFFICE 2,274,705

BUILDING MATERIAL AND METHOD OF MAKING THE SAME

Lewis C. Karrick, Salt Lake City, Utah

No Drawing. Application November 24, 1937,
Serial No. 176,279

3 Claims. (Cl. 106—110)

This invention relates to building material and methods of making it, and more particularly to non-conducting building material of calcined gypsum and methods of making same.

Heretofore it has been a practice in some instances to prepare gypsum by finely pulverizing and subjecting it to dry heat while agitating it. Pulverizing has been employed primarily in order that the mass will become aerated and easily stirred in the mixing which accompanies calcination in the well-known kettle processes. Fine pulverizing requires a burdensome expense for machinery and power, and I have found that great economy is effected by eliminating pulverizing and, instead, merely breaking the rock gypsum down to granular sizes.

It is therefore an object of this invention to provide a method of making building material which will be efficient, quick, and economical in the pre-calcination operations.

It is old to calcine gypsum by subjecting it to open flame in a rotary kiln, but experience has established that such practice produces a yield of varying quality, besides frequently resulting in over-heating or under-heating the gypsum. In United States Patents Nos. 1,897,259 and 1,967,029, issued to William Leon Ellerbeck and me, is disclosed an internally heated drum wherein the powdered gypsum is calcined by tumbling it over tubes heated by electrical resistors. Recent experiments have established that better calcination is obtained if the heating is accurately controlled as to temperatures, and this is done in the present instance by heating the gypsum in an insulated tumbler drum having internal tubes for high pressure steam so that every point in the calciner is at exactly the same temperature.

It is another object of the present invention to provide for the calcination of gypsum material rapidly, conveniently, and under conditions which enable absolute control of the quality of the product.

It is another object of the invention to provide a method of calcining gypsum whereby the gypsum is subjected simultaneously to stirring by a controlled heating member without accidental over-heating or under-heating of the gypsum.

It has been observed, heretofore, that in the preparation of plaster with powdered gypsum, only a small portion of the mix water unites chemically with the gypsum, the larger proportion of the water evaporating from the plaster and leaving pores or voids throughout the body thereof. By mixing the plaster from a desired proportion of my granulated gypsum, I form a cellular product with no air pockets whatsoever in the cell walls, thereby obtaining a very strong plaster. Or, by sizing the granules and using certain proportions of some sizes, it is feasible strictly to control the gross density and strength of the final product.

In addition, it has been discovered that by pressing and/or immediately agitating the mix after adding the water, the density of the final product will be substantially increased. If desired, the granular body may be made with large voids, as by pouring off the surplus water. Also, the cost of the product may be reduced by mixing in certain proportions of raw gypsum.

It is, therefore, a further object of the invention to provide a plaster body which will be durable, strong, and economical to manufacture, and a method for making same whereby the physical properties of the final body may be easily controlled.

Among additional objects of the invention are the production of a building body of high strength and low heat conductivity and with good acoustic properties, requiring but a small amount of labor in its preparation on the job, as well as a body easily manufactured of several different types of gypsum.

A substantial view of the prior art for calcination of powdered gypsum may be obtained by reference to the patents enumerated above. In the practice of the present invention, the rock gypsum is dumped into any suitable mill and crushed to a granulated, as distinguished from a powdered, size. This operation incidentally will result in the powdering of some of the gypsum, but the powdered portion is salvaged and utilized in accordance with the invention.

The crushed product is then subjected to calcination in the tumbler or revolving drum including internally disposed heating tubes through which is circulated high pressure steam. It has been found that by jacketing the rotary calciner with several inches of good insulating material, the granular gypsum is efficiently and accurately heated by contacting with these tubes. The precise values employed in the treatment may vary somewhat in relation to the properties of the particular material being calcined. However, I have found that the invention may successfully be practiced with a standard high-grade gypsum as follows:

The steam may be heated to 67 pounds absolute (300° C.) in a boiler and delivered into the heating tubes without drop in pressure, and this saturated steam temperature has been found to be high enough to calcine gypsums to the "first settle" stage. I prefer, however, to use saturated steam of at least 75 pounds pressure (308° F.) in order to obtain more rapid heating and thereby speed up the process. If it is desired to calcine to the "second settle" stage, it has been found that a saturated steam pressure of 96 pounds per square inch (325° F.) is adequate, although the process may be expedited if the steam is used at a higher pressure. In producing "first settle" plaster, it is important to keep the steam temperature close to the final temperature desired for the plaster product in order to avoid some of the gypsum becoming calcined considerably beyond the half-hydrate stage with the well-known effects on water absorption, strength, heat of setting, as well as other properties of the product. However, if a "second settle" product is desired, steam temperature may be considerably above that corresponding to the temperature at which this product is formed, since I have found that the plaster qualities do not change much if the temperature corresponding to "second settle" is exceeded, that is until the temperature passes 400° F. Consequently, in producing "second settle" plaster, I often use saturated steam in the heating tubes at 200 pounds absolute pressure, which corresponds to 382° F.

In the above operation, the heating by high pressure steam has not only been found to admit of precise control to enable a desired quality in the product, but it is also economical. For example, distilled water may be used in the steam system and vaporized to form steam. Obviously the heat delivered to the gypsum is the latent heat of condensation of the steam, the water thus formed being continuously returned to the boiler wherein it is re-vaporized as fresh steam for further calcining work. By thus continually re-using the distilled water, it is necessary at rare intervals to add fresh water to the system, only in amount to compensate for losses due to leakage from pipe joints or connections.

In the calcining phase, therefore, no fire is brought into contact with any part of the calcining equipment; in fact, the furnace may be located at a remote part of the manufacturing plant. It will be observed that every point in the rotary calciner is at exactly the same temperature so that no over-heating or under-heating of the gypsum is possible. Thus the process avoids the uncertainties characterizing the kettle type calciner used heretofore.

To understand the third or plaster-forming phase of my invention, it will be necessary to bear in mind that whereas most commercial gypsum plasters require between 55 and 65 grams of water to 100 grams of plaster in order to produce the state of plasticity described by the American Society for Testing Materials as "testing consistency" (this being a consistency approximately the same as that used in plastering walls), the plaster in setting takes into chemical union only approximately 15% of its weight of water. The balance of the 60 parts of water, that is from 40 to 50 grams more or less, finally evaporates from the mass, thereby forming pores or voids in the product in addition to those formed by air bubbles. Because these voids ordinarily are evenly distributed through the mass, the resulting product has many thin celled walls, causing the product to lack the desirable strength. While in my new composition material I do not avoid all air pockets, I do, however, form a cellular product which is entirely lacking in air pockets in the cell walls. It is also practicable, in the practice of the invention, to vary the size of the cells and thickness of the walls to any dimensions desired. The following operations have been employed satisfactorily in the production of the improved building material:

The granular calcined product obtained by the steps described above is screened as it comes from the calciner so as to remove all of the finer material, such as that below 16 mesh screen size. The finer material thus removed has been found to mix into a very smooth grain-free mass which I use for wall covering or for casting. The dust-free granular calcined gypsum is then used to form the new composition. The new composition is obtained by placing the dry material in molds, such as brick, block, or wall forms. Then water is poured into the forms so as thoroughly to wet the mass of granules. The mass will be found to settle together somewhat as the contact points of the granules soften and press together, due to the softening effect of the water in the voids between the lumps. In a few moments the mass sets, by which time the lumps have absorbed water throughout. The mass can then be taken from the molds, or the forms may be removed as the case may be, and the material permitted to finally harden and thoroughly dry out.

The primary advantage of my new product for use as a building material is due to its hardness. The wetted granules take up approximately 15% by weight of water, leaving no air pockets within them, and thus return to the hardness of the original rock gypsum. The granules are cemented together at their points of contact by the rehydrated gypsum, the density or hardness thereof being greatest where the pressure is greatest, that is between the granules where the water is largely squeezed out of the plaster-water mixture. Obviously this cementing zone is less dense as the distance increases from the center of greatest contacting area between the granules. The cementing film tends to eliminate the angularity of contact between the granules so that voids in the final mass become rather rounded.

From the foregoing it will be observed that the method is quite rapid, and it requires no mixer or mixing box; furthermore, there is no need for installing pulverizing equipment in the plant or power for driving same.

The invention is applicable to the production of building material to suit various specific requirements. For example, the size of the granules may be varied to control the size of the voids between granules and, therefore, the gross density of the final product. I have found that slight agitation of the mass immediately after adding the water causes settling, and this will greatly increase the density of the final mass besides increasing the conductivity and hardness of the product. Conversely, the heat and sound insulating properties may thereby be decreased. The acoustic properties of the material may thereby be pre-determined with convenience and reliability. It will be understood, therefore, that the density or percentage of voids in the mass can be easily controlled for any particular job merely by agitating the mass, also by applying pressure after the water is added. Any surface voids may then be filled with finishing plaster and water-proofed.

The nature of the product may also be controlled by utilizing for the mix carefully sized masses of the granules; and in some instances this may be still further employed with immediately pouring off the surplus water which has not been absorbed into the granules. This operation increases the size of the voids in the final product. Furthermore, in order to reduce the cost of the finished material, it is feasible to substitute granules of cleansed raw gypsum for some of the calcined granules. Upon setting, such mixture develops a very strong bond between the rough surfaces of the raw gypsum and the re-hydrated plaster. In the latter instance, the technique may be further changed so as to have proportions of both raw and calcined gypsum, and in various screen sizes. This operation may be controlled to produce a dense aggregate so that when the wetted mass is pressed, a very hard flooring or block plaster is obtained. When this is set, dried, sanded down, and varnished, a very beautiful surface is obtained. The method has been practiced and very fine product has resulted using granules up to 1 inch in diameter.

It is obvious that various changes and modifications may be made in the details of steps and quantities of the above specifically described embodiments of this invention without departing from the spirit thereof, and both method and product of the present invention include all such changes, modifications, substitutions, and equivalents as come within the scope of the following appended claims.

What I claim is:

1. A gypsum plaster composition adapted to use in building blocks, bricks, walls and ceiling fabrication comprising uniformly sized coarse lumps of calcined gypsum which have been rehydrated while maintaining the relative positions of the said lumps substantially constant.

2. A gypsum plaster composition adapted to use in building blocks, bricks, walls and ceiling fabrication comprising uniformly sized coarse lumps of calcined gypsum which have been rehydrated in contact with lumps of raw gypsum while maintaining the relative positions of the said lumps substantially constant.

3. A method of forming an element of building construction which comprises calcining lumps of gypsum, placing the said lumps in position to define said element, and rehydrating the lumps while maintaining the relative positions thereof substantially constant.

LEWIS C. KARRICK.